(12) United States Patent
Gasparini et al.

(10) Patent No.: US 12,081,128 B2
(45) Date of Patent: Sep. 3, 2024

(54) METHOD FOR CONTROLLING A SINGLE INPUT DUAL OUTPUT DC-DC CONVERTER, CORRESPONDING CONVERTER AND COMPUTER PROGRAM PRODUCT

(71) Applicant: STMicroelectronics S.r.l., Agrate Brianza (IT)

(72) Inventors: Alessandro Gasparini, Cusano Milanino (IT); Mauro Leoncini, Varese (IT); Claudio Luise, Pescara (IT); Alberto Cattani, Cislago (IT); Massimo Ghioni, Monza (IT); Salvatore Levantino, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/885,901

(22) Filed: Aug. 11, 2022

(65) Prior Publication Data
US 2023/0055825 A1 Feb. 23, 2023

(30) Foreign Application Priority Data
Aug. 20, 2021 (IT) .......... 102021000022130

(51) Int. Cl.
*H02J 1/10* (2006.01)
*H02M 3/158* (2006.01)
*H05B 45/3725* (2020.01)

(52) U.S. Cl.
CPC .......... *H02M 3/1582* (2013.01); *H02J 1/102* (2013.01); *H05B 45/3725* (2020.01)

(58) Field of Classification Search
CPC ........ H02J 1/10; H02J 1/102; H02J 2001/104; H02M 3/02; H02M 3/04; H02M 3/10;
(Continued)

(56) References Cited

U.S. PATENT DOCUMENTS

| 2009/0167264 A1 | 7/2009 | Bayer et al. |
| 2011/0089917 A1* | 4/2011 | Chen ................... H02M 3/1584 323/282 |

(Continued)

OTHER PUBLICATIONS

IT Search Report and Written Opinion for priority application, IT 102021000022130, report dated Apr. 20, 2022, 7 pgs.

*Primary Examiner* — Long Nguyen
(74) *Attorney, Agent, or Firm* — STMicroelectronics S.r.l.

(57) ABSTRACT

A Single Input Dual Output converter includes a first switch coupling an input to a first inductor terminal, a second switch coupling a second inductor terminal to ground, a third switch coupling the second inductor terminal to a positive output, and a fourth switch coupling the first inductor terminal to a negative output. During time-shared control, the negative and positive outputs are independently served by conversion cycles. Each conversion cycle includes: a positive phase with a positive charge phase (closing only the first and second switches), followed by an additional phase (closing only the first and third switches for a given time duration), and followed by a positive discharge phase (closing only the third and fourth switches). Each conversion cycle further includes a negative phase with a negative charge phase (closing only the first and second switches) followed by a negative discharge phase (closing only the second and fourth switches).

10 Claims, 5 Drawing Sheets

(58) Field of Classification Search
CPC ...... H02M 3/145; H02M 3/155; H02M 3/156; H02M 3/158; H02M 3/1582; H02M 1/0083; H02M 1/009; H05B 45/37; H05B 45/3725; H05B 45/375; H05B 45/38; H05B 45/385
See application file for complete search history.

(56) References Cited

U.S. PATENT DOCUMENTS

2015/0236594 A1    8/2015   Branca
2017/0271987 A1*   9/2017   Yu ........................ H02M 3/1582

\* cited by examiner

METHOD FOR CONTROLLING A SINGLE INPUT DUAL OUTPUT DC-DC CONVERTER, CORRESPONDING CONVERTER AND COMPUTER PROGRAM PRODUCT

PRIORITY CLAIM

This application claims the priority benefit of Italian Application for Patent No. 102021000022130, filed on Aug. 20, 2021, the content of which is hereby incorporated by reference in its entirety to the maximum extent allowable by law.

TECHNICAL FIELD

Embodiments of the present disclosure relate to techniques for controlling a Single Input Dual Output DC-DC converter.

Embodiments of the present disclosure relate in particular to driving an LED display, where the load is connected between the outputs of the converter.

BACKGROUND

Standard LC switching DC-DC converters have proven to reach very high efficiency while providing a stable and regulated output voltages. In the design phase, the value of the inductance and the output capacitance must be selected based on the target specifications such as switching frequency, output voltage ripples and maximum required load current. To match the specifications, most circuit applications require values for inductances and capacitances in the μH and μg range, respectively. As a result, these large reactive components dominate (together with the large power-MOS) the overall area occupation of the converter. Between such two components, commercially available inductances have less energy density with respect to capacitances, making them the single components with the largest volume in the whole chip.

To solve this problem, a possible solution is to share a single inductance between multiple converters. Such a solution experiences a large reduction in the overall area occupation, proportional to the number of outputs for which the inductor is shared. However, the control scheme of such a structure is complex. Operation in Continuous Conduction Mode (CCM) in such converters is difficult to handle.

A simple approach may be represented by a time-shared control where each output is served independently with charge packets on request. Packets may, for instance, have same charge or may have same peak current.

The advantages of this solution are the inherent isolation between the channels (the inductor is fully discharged on each cycle) and the simple control scheme. The disadvantages are mainly related to any DCM operation where larger ripples are present for a given average load current.

To this regard, FIG. 1 shows a circuit schematic representing a time-shared control for a Single Input Dual Output (SIDO) converter, indicated with the numeric reference 10, with buck-boost and inverting buck-boost outputs, which correspond in particular to a positive and a negative voltage, which can be used as positive voltage supply, e.g., VDD, and negative voltage supply, e.g., VSS, for supplying devices such as LED displays. Thus, the converter 10 can be the converter of an LED display. The corresponding timing diagram of control signals for the circuit of FIG. 1 is shown in FIG. 2.

The converter 10 comprises an input node IN to which is coupled a voltage generator 11 generating an input voltage Vin, in particular a DC voltage. The input node IN is coupled by a switch SW1 to a node N1, which is the input node or terminal of an inductor L. In the example the switches SW1 to SW5 are embodied by power MOSFETs—in particular SW1 and SW3 are p-channel power MOSFETs, while SW2, SW4 and SW5 are n-channel power MOSFETs—with a drain-source body diode. In variant embodiments, all the switches SW1 to SW5 may be of an n-channel type, including the first switch SW1, which has to be coupled and driven accordingly, or vice versa of the p-channel type. For the switch SW1, the source is coupled to the input node IN and the drain is coupled to node N1. The open and close state of the switch SW1 and of the other switches of the circuit 10 is controlled by a respective switch signal applied to the gate of the switch SW1 by a control circuit module, not shown in FIG. 1. Such switch signals are represented in FIG. 2. A switch SW5 is coupled between node N1 and ground GND, the switch SW5 being however a MOSFET with back-to-back diodes. A switch SW4 is coupled between node N1 and the negative supply voltage output OVSS, with the source coupled to the supply voltage output OVSS on which a negative voltage is formed, through a load capacitor $C_{OVSS}$. The second terminal N2 of the inductor L is coupled to a switch SW2, which is then coupled, in particular by the source, to ground GND. A switch SW3 is interposed between node N2 and a positive supply voltage output node OVDD, coupling the drain to the node N2 and the source to the output node OVDD, where a load capacitor $C_{OVDD}$ is coupled to the ground GND. The switch SW5 with back-to-back diode is required while serving the positive supply voltage VDD on the positive output OVDD to provide an inversion of the voltage across the inductance L, thereby discharging it.

FIG. 2 shows a timing diagram of the time-shared control controlling the circuit of FIG. 1 with buck-boost and inverting buck-boost output.

OVDD indicates the voltage on the positive supply voltage output node OVDD, and REF–OVDD is a reference value which is stored in the control module of the converter 10. In the same way, OSS indicates the voltage on the negative supply voltage output node OVSS, and REF_OVSS is a reference value which is stored in the control module of the converter 10.

$I_L$ indicates the current flowing from node N1 to node N2 of the inductor L.

The signals commanding the open and close states of switches SW1-SW5 are indicated by the same references.

The time share control comprises a conversion cycle CC which starts when the voltage on the positive output OVDD goes below the corresponding reference voltage REF_OVDD. This starts a positive charge phase P1, where the inductance L is charged until its peak value is reached by turning on only the first switches SW1 and SW2. This positive phase P1 for OVDD needs the same switches to be ON as the positive phase N1 of OVSS. After the positive charge phase P1, the positive supply node OVDD or output is then charged by turning on the third switch SW3 and fifth switch SW5 in a positive discharge phase PP2, where the charge in the inductance L is discharged to the positive supply node OVDD. The conversion cycle CC comprises also a negative cycle, which starts when the negative voltage on the negative voltage supply node OVSS rises above the respective reference voltage REF_OVSS. As mentioned, then a negative charge phase N1 similar to the positive charge phase P1 is performed, closing switches SW1, SW2 whereas the charge is transferred to the negative supply voltage node OVSS, or output, in a subsequent negative discharge phase NP2 by turning on the second switch SW2 and the fourth switch SW4. The positive cycle PC and the negative cycle NC end when the inductance L is fully discharged, this is detected with a Zero-Current-Detector (ZCD), not shown in FIG. 1.

The trigger of the two outputs OVDD or OVSS can be managed by a simple arbiter mechanism to avoid superpositions between the OVDD and the OVSS trigger.

This solution presents problem in term of area and efficiency, in particular because of the switch necessitating a back-to-back diode, i.e., the switch SW5.

It is in fact observed that of the five switches employed in the topology of SIDO converter in FIG. 1, the fifth switch SW5 is used to discharge the inductance current to the positive supply voltage output node OVDD. Therefore, the conversion process in fact requires to attach the inductor to a voltage potential lower than the potential on the positive voltage supply node OVDD output, and not necessarily to ground by a specific switch.

SUMMARY

One or more embodiments relate to a circuit. Embodiments moreover concern a related system as well as a corresponding method.

The present disclosure provides solutions regarding a method for controlling a Single Input Dual Output converter, comprising an input node, a positive output node and a negative output node, an inductor and a set of switches comprising a first switch coupling said input node of the converter to a first terminal of the inductor, a second switch coupling a second terminal of the inductor to ground, a third switch coupling the second terminal to said positive output node, and a fourth switch coupling the first terminal to a negative output node. The method comprises controlling said converter by a time-shared control comprising serving to each of the negative output and positive output independently charge packets according to conversion cycles, a conversion cycle comprising a positive phase including a positive charge phase in which only the first and second switch are closed, and a positive discharge phase in which only the third switch and the fourth switch are closed, and a negative phase including a negative charge phase in which only the first and second switch are closed, and a negative discharge phase in which only the second switch and the fourth switch are closed. Said positive phase further comprises between said positive charge phase and positive discharge phase an additional phase in which only the first switch and the third switch are closed for a given time duration.

The present disclosure also provides solutions regarding a Single Input Dual Output converter comprising an input node, a positive output node and a negative output node, an inductor and a set of switches comprising a first switch coupling an input node of the converter to a first terminal of the inductor, a second switch coupling a second terminal of the inductor to ground, a third switch coupling the second terminal to a positive output node, and a fourth switch coupling the first terminal to a negative output node. Said Single Input Dual Output converter is controlled by the method according to any of the previous embodiments.

In variant embodiments, said switches are power MOSFET switches.

The present disclosure also provides solutions regarding a computer program product that can be loaded into the memory of at least one computer and comprises parts of software code that are able to execute the steps of the method according to any of the previous embodiments when the product is run on at least one computer.

BRIEF DESCRIPTION OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
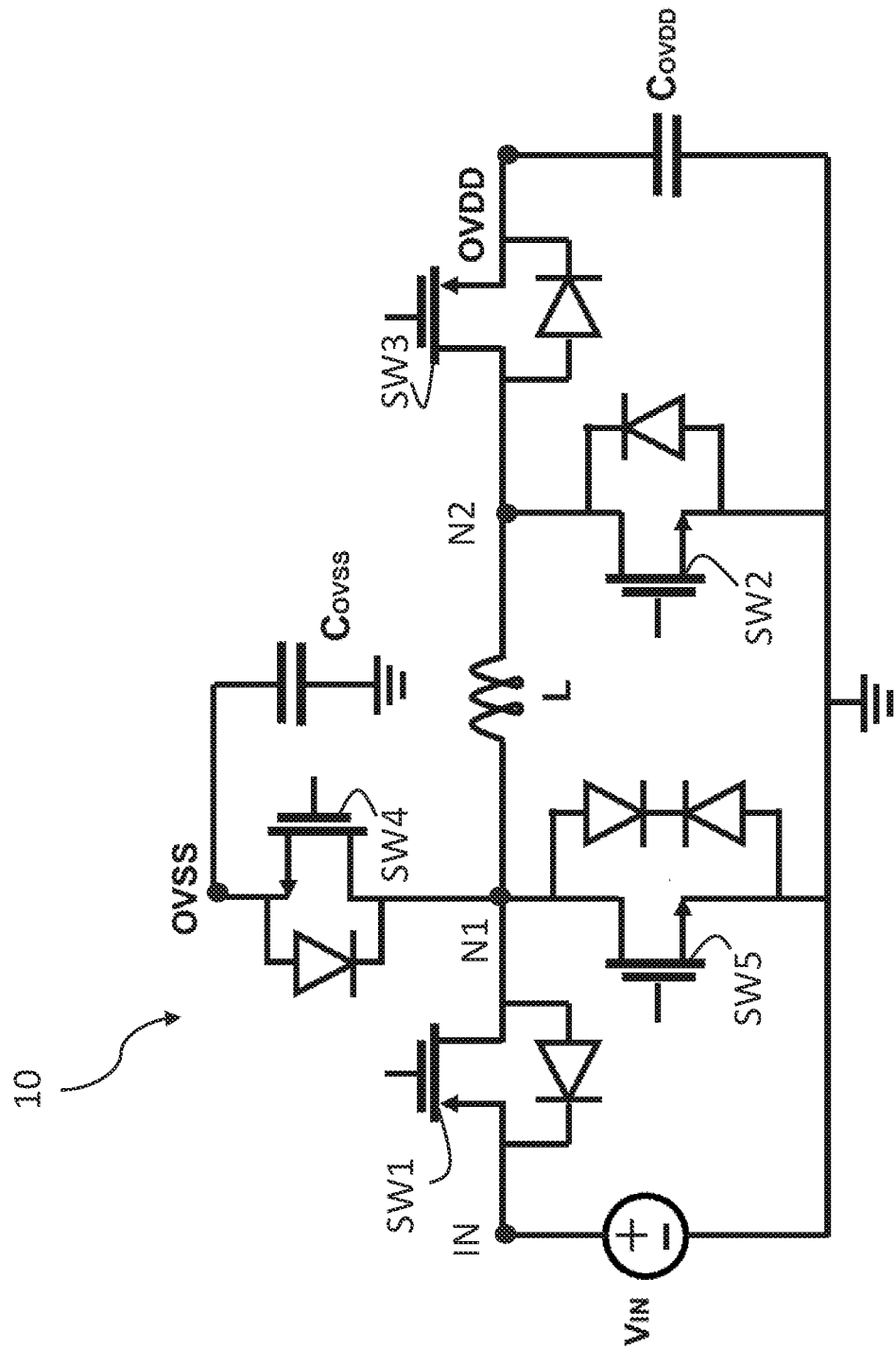
FIG. 1 is a circuit diagram of a converter.
Figure 2:
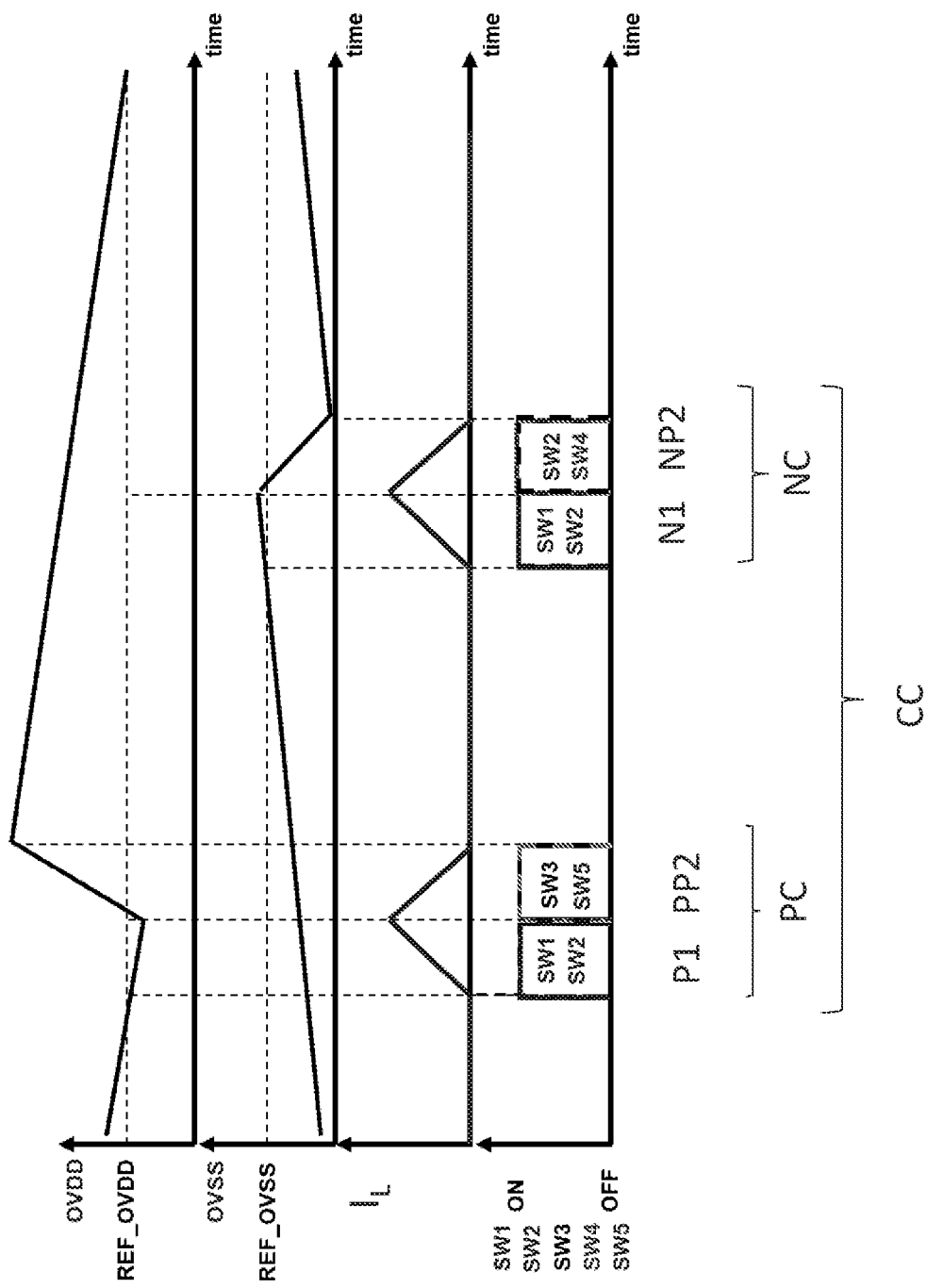
FIG. 2 is a timing diagram for operation of the converter shown in FIG. 1.

Figures parts, elements or components which have already been described with reference to FIGS. 1 to 2 are denoted by the same references previously used in such Figures; the description of such previously described elements will not be repeated in the following in order not to overburden the present detailed description.

As noted above, the conversion process in FIGS. 1 and 2 in fact requires to attach the inductor to a voltage potential lower than the potential on the positive voltage supply node OVDD output, and not necessarily to ground by a specific switch. To obviate this, a method of controlling a SIDO converter may be applied which provides using the negative supply voltage VSS as negative reference for the discharging phase of the inductor while serving the positive negative supply voltage VDD at the corresponding output OVDD. This allows eliminating the switch indicated with SW5 in FIG. 1, coupling the input node N1 of the inductor L to ground GND, thus eliminating the MOSFET with back-to-back diode, i.e., saving area and increasing efficiency.

Therefore, this solution provides an increase in the power density of the SIDO converter. Being the power switches are the component with the largest area inside the die, this potentially reduces the overall area to about ⅘, i.e., 80%, of the original one. In practice, the reduction is even greater since the above-mentioned switch requires a back-to-back diode which certainly increases the area occupation for a given drain to source on resistance value.

As mentioned, the low-voltage node required to discharge the inductor L while serving the voltage to the positive supply output OVDD is changed to the negative supply OVSS output node, which is, in the schematics shown, the inverting buck-boost output. Its value is zero at the start-up and smaller than zero during all the other operating points, so it represents always a viable low voltage point.

Figure 3:
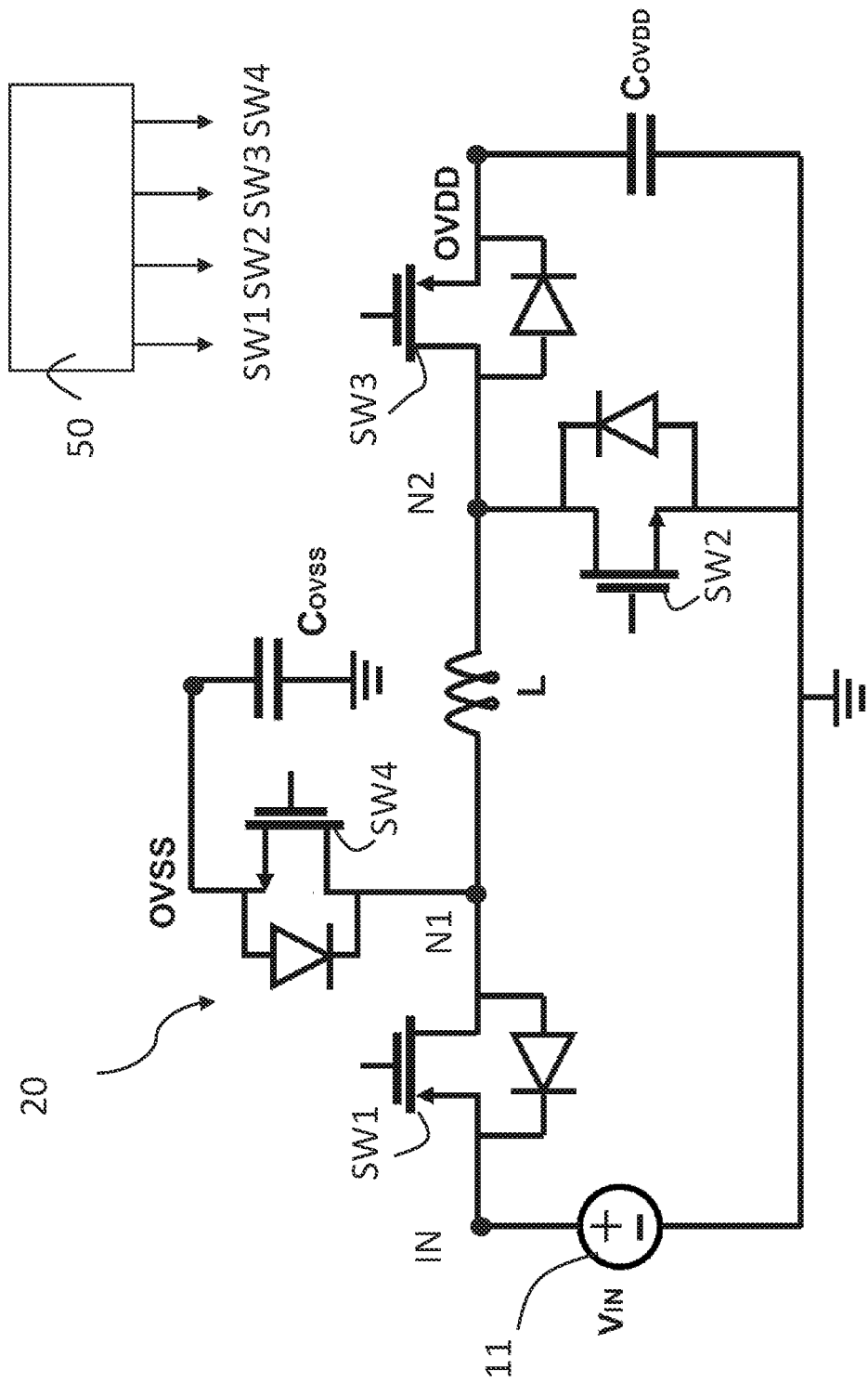
FIG. 3 is a circuit diagram of a converter.

FIG. 3 shows the schematics of a DC-DC SIDO converter 20 with four switches, as discussed above. The references are the same of FIG. 1 for corresponding components, which evidences that converter 20 corresponds to the converter 10, to the exception of the removal of the switch SW5. Thus, the converter 20 can be defined as a four switch SIDO converted with buck-boost and inverting buck-boost outputs.

FIG. 3 further shows the control logic circuit module 50, which supplies the switch signals controlling the switches SW1, SW2, SW3, SW4, which may be embodied by a logic module or microprocessor or other controlling module which is used to drive the SIDO converters.

Figure 4:
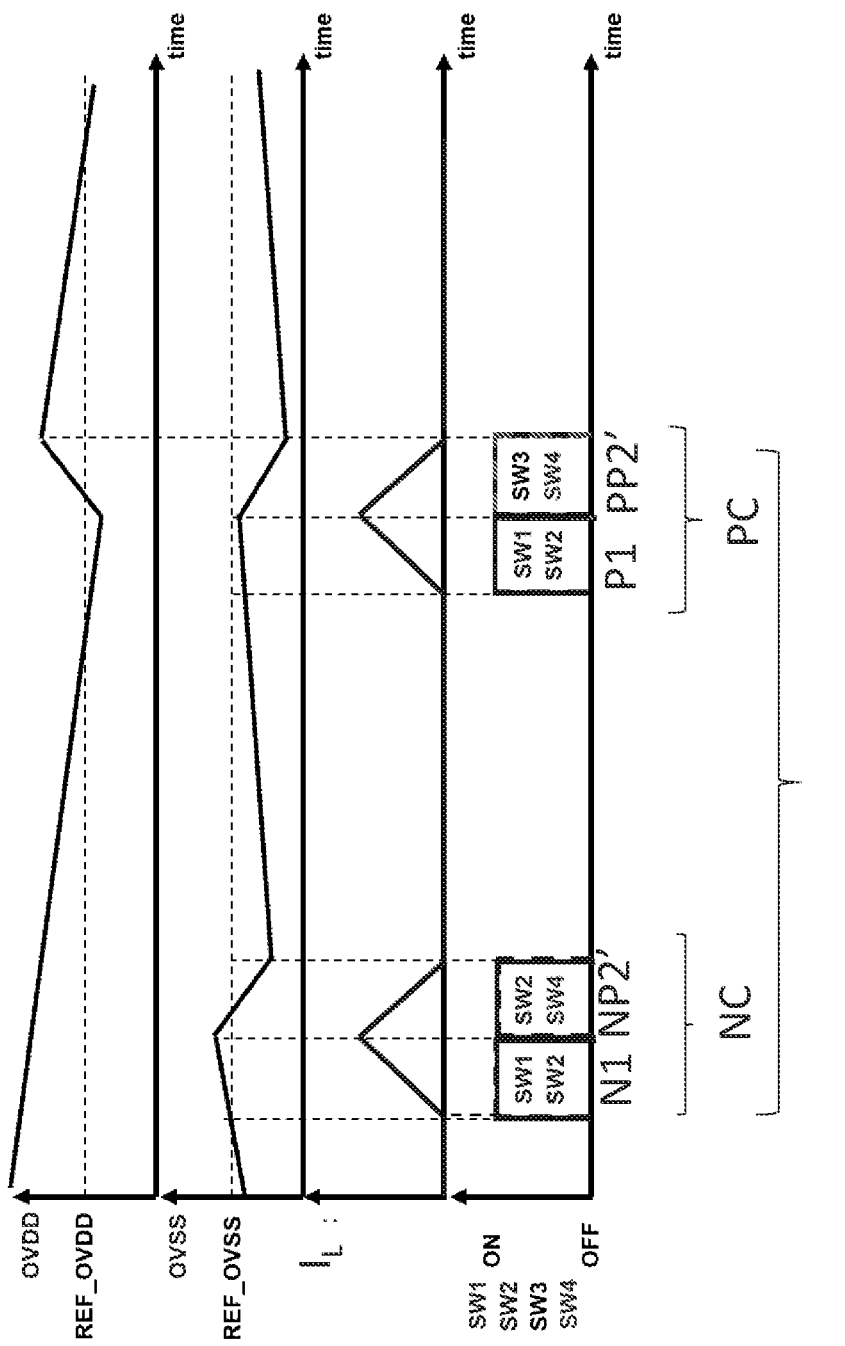
FIG. 4 is a timing diagram for operation of the converter shown in FIG. 3.

FIG. 4 shows a timing diagram of the time-shared control in the four switch SIDO 20 with buck-boost and inverting buck-boost outputs. The signals are the same of the diagram of FIG. 2, with the exception of the switch signal of switch SW5 which is of course not present.

The positive or negative charge phase P1 is equal to the one described in FIG. 2, i.e., only switches SW1 and SW2 closed, while the positive discharge phase PP2' is performed by closing switches SW3 and SW4, the negative second phase NP2' is performed by closing switches SW2 and SW4.

Thus, with reference to FIGS. 3 and 4, in a Single Input Dual Output converter, 20, where the set of switches comprises, a first switch, SW1, coupling the input node IN of the converter 20 to a first terminal N1 of the inductor L, a second switch, SW2, coupling a second terminal N2 of the inductor to ground GND, a third switch, SW3, coupling the second terminal N2 to said positive output node OVDD, a fourth switch, SW4 coupling the first terminal N1 to the negative output node OVSS, a method for controlling comprises: controlling the converter 20 by a time-shared control comprising serving to each of the negative output OVSS and positive output OVDD independently charge packets according to conversion cycles CC, a conversion cycle CC comprising: a positive phase PC including a positive charge phase P1 in which only the first SW1 and second SW2 switch are closed, and a positive discharge phase PP2' in which only the third switch SW3 and the fourth switch SW4 are closed, a negative phase NC including a negative charge phase N1 in which only the first SW1 and second SW2 switch are closed, and a negative discharge phase NP2' in which only the second switch SW2 and the fourth switch SW4 are closed.

Looking at the time-diagram in FIG. 4 it is apparent that no changes with respect to FIG. 2 are present in the negative cycle NC required to serve the negative supply node OVSS. In the positive cycle PC, the inductance L is now discharged through the negative supply node OVSS, turning on, i.e., closing, the fourth switch SW4.

In this configuration, however, each time some charge is transferred to the positive supply node OVDD, the same amount of charge is also transferred to the negative supply node OVSS.

Therefore, it is sufficient for a little unbalance between the current sink by the positive supply node OVDD and the negative supply node OVSS to let the voltage on the latter node be charged indefinitely. Thus, it would be required applications where the current drained from the two voltage supply outputs are equal.

In brief, the solution here described provides a method for using a four switch converter in an effective manner, driving the switches in a way that avoids difficulties deriving from current imbalance, providing in particular a driving method of such a circuit, which in the positive phase comprises between the positive charge phase and the positive discharge phase an additional phase in which only the first switch coupling the input node of the converter to the first terminal of the inductor and the third switch coupling the second terminal of the inductor to said positive output node, are closed for a given time duration. This time duration, during which the closing states overlay, coupling in fact the inductor between input and positive output node is indicated as overlap time.

Figure 5:
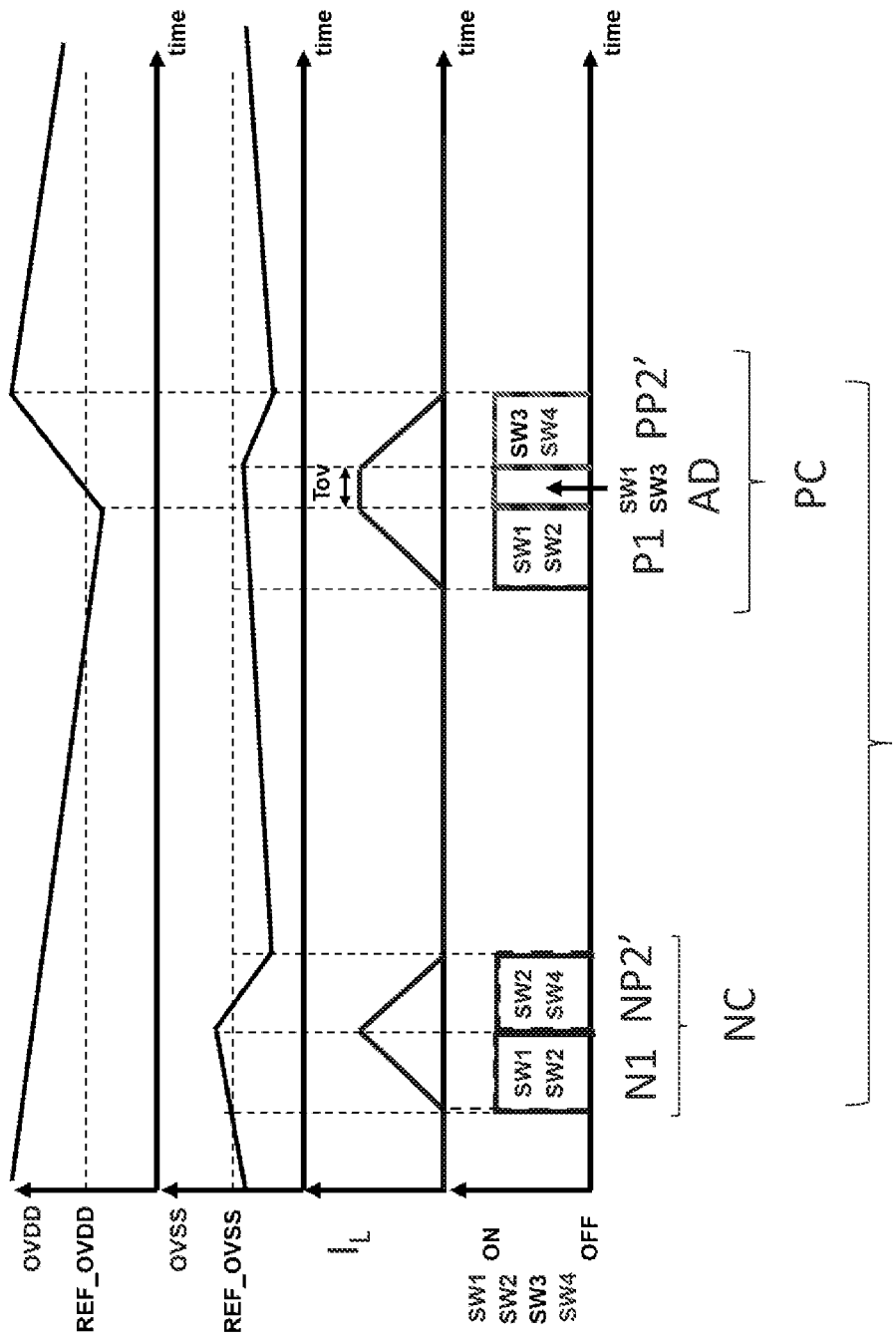
FIG. 5 is a timing diagram for operation of the converter shown in FIG. 3.

FIG. 5 shows a timing diagram referred to an embodiment of the solution here described, i.e., an embodiment of a method for controlling a Single Input Dual Output converter such as the converter 20 of FIG. 3. The method described with reference to FIG. 5 is better able to manage a little unbalance between the positive supply node OVDD and the negative supply node OVSS currents of the converter 20. In fact, even if the current drained by positive supply node OVDD and negative supply node OVSS in the LED display application is nominally the same, a little unbalance between the two can be easily generated by mismatches, leakages, or power MOS driving losses. A solution to manage such an unbalance is thus necessary to design a reliable converter. The problem arises because all the charge transferred to the positive supply node OVDD is also transferred to the negative supply node OVSS. With a proper modification in the switching sequence it is possible to avoid this problem. The circuit schematic is the same in FIG. 3, while the timing diagrams are shown in FIG. 5.

With respect to the previous switching configuration, an additional phase AD is inserted in the positive cycle PC, where the voltage is served to the positive supply VDD. During such additional phase AD, which is located between the positive charge phase P1 and the positive discharge phase PP2' for serving the positive output node OVDD, switches SW1 and switches SW3 are closed, providing a direct path from the input node IN to the positive supply node OVDD output. During such additional phase AD, which lasts for a fixed duration overlap time, $T_{OV}$, the charge is only delivered to the positive supply node OVDD and not to the negative supply node OVSS. In the phase PP2' that follows, the charge is delivered to the positive output OVDD, closing switch SW3 and the inductor L is discharged closing switch SW4. Thanks to this unbalance, the circuit is now capable of handling a current difference between the two outputs. The maximum unbalance depends on the choice of the inductor peak current value and the overlap time $T_{OV}$.

The current over the inductance L during the overlap time $T_{OV}$ may increase, decrease or stay flat, as in FIG. 5, depending on the relative value of the input voltage Vin, in particular a DC voltage, with respect to voltage on the positive output node OVDD. However, this is not a problem since the goal of the additional phase AD is to provide charge solely to the positive output node OVDD, and its fixed duration is very short for the target application. In setting this fixed duration, it should be taken into account to evaluate the worst-case during the sizing of the overlap time $T_{OV}$. This depends on the worst case maximum current unbalance that is expected. By way of example: considering a worst-case unbalance of the currents of 10% and the current during the overlap time $T_{OV}$ to be flat, it may be sufficient to set the fixed size of the overlap time such that the amount of charge injected in the positive output OVDD is 10% more than the one injected in the negative output OVSS. Naming the time duration of the discharge phase PP2' $T_{discharge}$, it may be sufficient that the charge injected in the overlap phase (i.e., a rectangle with area $T_{OV}*I_{peak}$, where $I_{peak}$ is the peak current in the inductance L during the additional phase AD) is one tenth of the charge injected in the discharge phase (i.e., a triangle with area $(I_{peak}*T_{discharge})/2$. This leads for instance to an overlap time $T_{OV}$:

$$T_{OV} = \frac{T_{discharge}}{20}$$

In absolute terms, one has to express the discharge time considering the voltage drop across the inductance L during the discharge phase PP2', leading to:

$$T_{OV} = \frac{L \cdot I_{peak}}{20 \cdot (OVDD - OVSS)}$$

This is to be evaluated in the worst case of maximum discharge time: i.e., maximum $I_{peak}$, minimum difference (OVDD–OVSS). By the way, OVSS is a negative number in this equation, so OVDD–OVSS is a positive number with magnitude>OVDD.

The number of power MOS devices that switch ON and OFF during the proposed OVDD switching sequence, with the additional phase AD, may appear larger with respect to the previous solution. This would lead to worse switching power consumption. However, this is not true; if it is considered the solution of FIGS. 1 and 2, SW1, SW2, SW3, and SW4 are turned on and off during a cycle CC. In the timing diagram in FIG. 5, the same number of switches are activated in the cycle CC; the only difference is the timing at which they are turned ON and OFF.

Thus, the embodiment described with reference to FIG. 5 corresponds to a method using the circuit of FIG. 3 and which respect to the method of FIG. 5, further provides that said positive phase, PC, comprises between said positive charge phase P1 and positive discharge phase PP2' an additional phase AD in which only the first switch SW1 and the third switch SW3 are closed for a given time duration $T_{OV}$.

Therefore, the method described with reference to FIG. 5 is a method for controlling a Single Input Dual Output converter, comprising an input node IN, a positive output node OVDD and a negative output node OVSS, an inductor L and a set of switches SW1, SW2, SW3, SW4 comprising a first switch SW1 coupling said input node IN of the converter to a first terminal N1 of the inductor L, a second switch SW2 coupling a second terminal N2 of the inductor to ground GND, a third switch SW3 coupling the second terminal N2 to said positive output node OVDD, and a fourth switch SW4 coupling the first terminal N1 to a negative output node OVSS. The method comprises controlling said converter 20 by a time-shared control comprising serving to each of the negative output OVSS and positive output OVDD independently charge packets according to conversion cycles CC, a conversion cycle CC comprising a positive phase PC including a positive charge phase P1 in which only the first SW1 and second SW2 switch are closed, and a positive discharge phase PP2' in which only the third switch SW3 and the fourth switch SW4 are closed, a negative phase NC including a negative charge phase N1 in which only the first SW1 and second SW2 switch are closed, and a negative discharge phase NP2' in which only the second switch SW2 and the fourth switch SW4 are closed. Furthermore, said positive phase PC comprises, between said positive charge phase P1 and positive discharge phase PP2', an additional phase AD in which only the first switch SW1 and the third switch SW3 are closed for a given time duration $T_{OV}$.

The described solution thus has several advantages with respect to other solutions.

The solution proposed increases the efficiency and the area occupation of the converter, avoiding the presence of a bulky power MOS with a back-to-back diode. This is obtained by an alternative power stage that removes the aforementioned switch SW5, using OVSS as a low voltage potential to discharge the inductance during the OVDD charging phase. Also, a novel switching scheme has been introduced to manage little unbalance between the two output currents, which can normally occur in a real application. The proposed solution does not increase the switching activity of the power MOS with respect to the prior solutions.

Of course, without prejudice to the principle of the invention, the details of construction and the embodiments may vary widely with respect to what has been described and illustrated herein purely by way of example, without thereby departing from the scope of the present invention, as defined by the ensuing claims.

In the embodiment shown, like in the prior art, the positive cycle and the negative cycle end when the inductance is fully discharged, this being detected for instance with a Zero-Current-Detector (ZCD).

The claims are an integral part of the technical teaching of the disclosure provided herein.

The invention claimed is:

1. A method for controlling a Single Input Dual Output (SIDO) converter, wherein said SIDO converter comprises:
   an input node;
   a positive output node;
   a negative output node;
   an inductor; and
   a set of switches including a first switch coupling said input node of the converter to a first terminal of the inductor, a second switch coupling a second terminal of the inductor to ground, a third switch coupling the second terminal to said positive output node, and a fourth switch coupling the first terminal to said negative output node;
   said method comprising:
      controlling said SIDO converter by a time-shared control where charge packets are independently served to each of the negative output node and the positive output node according to conversion cycles wherein each conversion cycle comprises:
         a positive phase including a positive inductor charge phase in which only the first and second switches are closed followed by a positive inductor discharge phase in which only the third and fourth switches are closed; and
         a negative phase including a negative inductor charge phase in which only the first and second switches are closed followed by a negative inductor discharge phase in which only the second and fourth switches are closed; and wherein said positive phase further comprises, between said positive inductor charge phase and positive inductor discharge phase, an additional phase in which only the first and third switches are closed for an always fixed time duration set as a function of a worst case of an imbalance between current delivered to the negative output node and current delivered to the positive output node.

2. The method of claim 1, wherein the fixed time duration (Tov) corresponds to:

$$Tov = \frac{L \cdot I_{peak}}{a \cdot (OVDD - OVSS)}$$

where L is an inductance of the inductor of the SIDO converter, $I_{peak}$ is a peak current in the inductor during the additional phase, OVDD-OVSS is a minimum voltage difference between voltages at the positive and negative output nodes, and a is a constant.

3. The method according to claim 2, wherein the constant a is set as a function of an amount of charge to be injected in the positive output node more than an amount of charge to be injected in the negative output node.

4. A Single Input Dual Output (SIDO) converter, comprising:
an input node;
a positive output node;
a negative output node;
an inductor;
a set of switches comprising a first switch coupling said input node of the converter to a first terminal of the inductor, a second switch coupling a second terminal of the inductor to ground, a third switch coupling the second terminal to said positive output node, and a fourth switch coupling the first terminal to said negative output node; and
a control circuit configured to generate control signals for selectively actuating the first through fourth switches, wherein said control circuit generates the control signals to control said SIDO converter by a time-shared control where charge packets are independently served to each of the negative output node and the positive output node according to conversion cycles wherein each conversion cycle comprises:
during a positive phase: actuating only the first and second switches in a positive inductor charge phase followed by actuating only the third and fourth switches in a positive inductor discharge phase; and
during a negative phase: actuating only the first and second switches in a negative inductor charge phase followed by actuating only the second and fourth switches in a negative inductor discharge phase; and
wherein said control circuit further, during said positive phase between said positive inductor charge phase and positive inductor discharge phase, actuates only the first and third switches in an additional phase for an always fixed time duration set as a function of a worst case of an imbalance between current delivered to the negative output node and current delivered to the positive output node.

5. The converter according to claim 4, wherein the fixed time duration (Tov) corresponds to:

$$Tov = \frac{L \cdot I_{peak}}{a \cdot (OVDD - OVSS)}$$

where L is an inductance of the inductor of the SIDO converter, $I_{peak}$ is a peak current in the inductor during the additional phase, OVDD-OVSS is a minimum voltage difference between voltages at the positive and negative output nodes, and a is a constant.

6. The converter according to claim 5, wherein the constant a is set as a function of an amount of charge to be injected in the positive output node more than an amount of charge to be injected in the negative output node.

7. The converter according to claim 4, wherein said first through fourth switches are power MOSFET switches.

8. The converter according to claim 4, where the positive output and the negative output are coupled to a load comprising an LED display.

9. A method for controlling a Single Input Dual Output (SIDO) converter, wherein said SIDO converter comprises:
an input node;
a positive output node;
a negative output node;
an inductor; and
a set of switches including a first switch coupling said input node of the converter to a first terminal of the inductor, a second switch coupling a second terminal of the inductor to ground, a third switch coupling the second terminal to said positive output node, and a fourth switch coupling the first terminal to said negative output node;
said method comprising:
controlling said SIDO converter by a time-shared control where charge packets are independently served to each of the negative output node and the positive output node according to conversion cycles wherein each conversion cycle comprises:
a positive phase including a positive inductor charge phase in which only the first and second switches are closed followed by a positive inductor discharge phase in which only the third and fourth switches are closed; and
a negative phase including a negative inductor charge phase in which only the first and second switches are closed followed by a negative inductor discharge phase in which only the second and fourth switches are closed; and
wherein said positive phase further comprises, between said positive inductor charge phase and positive inductor discharge phase, an additional phase in which only the first and third switches are closed for a time duration that is set and unalterable.

10. A Single Input Dual Output (SIDO) converter, comprising:
an input node;
a positive output node;
a negative output node;
an inductor;
a set of switches comprising a first switch coupling said input node of the converter to a first terminal of the inductor, a second switch coupling a second terminal of the inductor to ground, a third switch coupling the second terminal to said positive output node, and a fourth switch coupling the first terminal to said negative output node; and a control circuit configured to generate control signals for selectively actuating the first through fourth switches, wherein said control circuit generates the control signals to control said SIDO converter by a time-shared control where charge packets are independently served to each of the negative output node and the positive output node according to conversion cycles wherein each conversion cycle comprises:
- during a positive phase: actuating only the first and second switches in a positive inductor charge phase followed by actuating only the third and fourth switches in a positive inductor discharge phase; and
- during a negative phase: actuating only the first and second switches in a negative inductor charge phase followed by actuating only the second and fourth switches in a negative inductor discharge phase; and wherein said control circuit further, during said positive phase between said positive inductor charge phase and positive inductor discharge phase, actuates only the first and third switches in an additional phase for a time duration that is set and unalterable.

\* \* \* \* \*